United States Patent [19]

Caretta et al.

[11] 4,146,415
[45] Mar. 27, 1979

[54] PROCESS FOR MANUFACTURING TIRES

[75] Inventors: Renato Caretta, Gallarate (Varese); Romano Guermandi; Maurizio Boiocchi, both of Milan, all of Italy

[73] Assignee: Industrie Pirelli, S.p.A., Milan, Italy

[21] Appl. No.: 832,910

[22] Filed: Sep. 13, 1977

[30] Foreign Application Priority Data

Nov. 5, 1976 [IT] Italy .............................. 29040 A/76

[51] Int. Cl.² .................. B29H 17/26; B29H 17/36
[52] U.S. Cl. ........................ 156/124; 152/361 R; 152/361 DM; 156/128 N; 156/133
[58] Field of Search .......... 156/123, 124, 126, 128 R, 156/128 N, 129, 133; 152/354 R, 356 R, 361 R, 361 DM, 357 R

[56] References Cited

U.S. PATENT DOCUMENTS

| 3,386,487 | 6/1968 | Massoubre | 152/361 |
|---|---|---|---|
| 3,503,432 | 3/1970 | Maiocchi | 152/176 |
| 3,863,696 | 2/1975 | Sperberg | 152/361 R |
| 3,900,062 | 8/1975 | Neville et al. | 152/361 |
| 3,960,628 | 6/1976 | Snyder | 156/123 |

FOREIGN PATENT DOCUMENTS

| 2361944 | 6/1975 | Fed. Rep. of Germany | 152/361 |
|---|---|---|---|
| 1246952 | 9/1971 | United Kingdom. | |
| 1307816 | 2/1973 | United Kingdom. | |

Primary Examiner—John E. Kittle
Attorney, Agent, or Firm—Stevens, Davis, Miller & Mosher

[57] ABSTRACT

A process is provided for the manufacture of radial tires for vehicle wheels, having an annular reinforcement structure inserted between the tread and the casing. The reinforcement structure has two layers of metal cord and in a radially outer position a third layer of cords arranged in a longitudinal direction. The third layer is made of a textile material which shrinks when heated. The process comprises the steps of first shaping the vulcanized casing to form a toroid, then applying to the shaped casing the two layers of metal cords together with a portion of the layer of textile cords at each side zone of the reinforcement structure. The width of the side zone is between ⅓ and 1/10 of the total width of the structure. The casing is shaped a second time to increase the external equatorial development thereof to a value greater than that reached during the first shaping step. The remaining central portion of the layer of textile cord is then applied on top of the layers of metal cords. A band of elastomeric material, forming the tread of the carcass is disposed on top of the layer of textile cords. The structure is then expanded and vulcanized in a pressurized mold.

4 Claims, 4 Drawing Figures

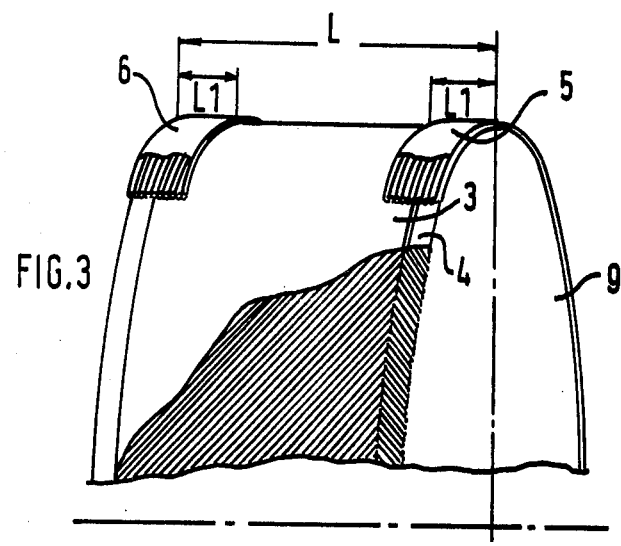
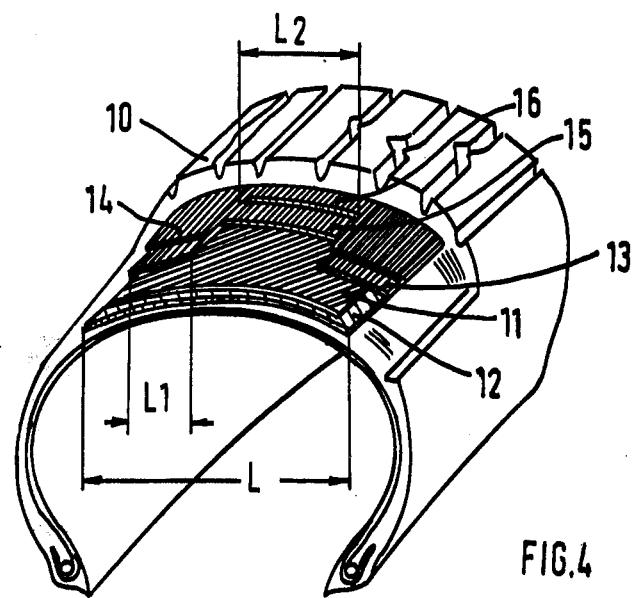

PROCESS FOR MANUFACTURING TIRES

This invention relates to a process for the manufacture of tires for vehicle wheels. More particularly, it relates to a process for the manufacture of tires having a radial casing (i.e., a casing formed by one or more plies, the cords of which lie in meridian planes or form small angles with these planes), a tread, and a specific reinforcement structure (the so-called "intermediate") inserted between the casing and the tread.

It is well known — particularly with regard to the manufacture of pneumatic tires with radial casing — that the said radial casing is shaped to form a toroid, usually before the reinforcement structure and the layer of rubber, which is to form the tread of the finished tire, are applied to it. The casing is usually formed and shaped by placing all the layers constituting the casing on the expandible drum, and then expanding the casing in a radial direction so that it then assumes the toroidal shape.

Finally, the reinforcement structure and the layer of rubber, which is to form the tread, are applied. In the vulcanizing mold, the tire undergoes further expansion — though only slight — as a result of the pressure introduced into the mold, which forces the tire against the walls of the mold.

From Italian Pat. No. 748,228, corresponding to U.S. Pat. No. 3,503,432, a radial tire is also known where the reinforcement structure is formed by two or more layers which are as wide as the tread and which consist of metal cords which are parallel to each other in each layer and crossed in relation to those of the other layer or layers, these cords being inclined at angles of between 5° and 30° in relation to the longitudinal direction. In addition, this reinforcement structure has one or more layers, approximately as wide as the tread, which are radially external to the layers indicated above and which are formed by cords which are parallel to each other and arranged in a longitudinal direction, these cords being made of a fabric, such as polyamide, which reduces in length when exposed to the effect of heat, so that when the tire is finished, the polyamide cords are in a state of pretension, due to the fact that their contraction, resulting from the heat of vulcanization, is opposed by the resistance offered by the layers of metal cords underneath.

In the course of subsequent research, it was noted that problems arose when applying the methods normally followed for shaping the casing and constructing the cover as described above, to the production of a radial tire having longitudinal polyamide cords in the reinforcement structure, such as excessive rigidity, which prejudices the degree of comfort, and a difficulty in obtaining a uniform arrangement of the metal and polyamide cords contained in the reinforcement layers between casing and tread for which reason the tire frequently possesses characteristics which vary from one zone to another. As the result of this research, a process for the manufacture of tires of the type described above was perfected, and is the subject of Italian patent application No. 25,355 A/74, filed on 19th July, 1974. According to that process, the casing is made into a cylinder on an expanding drum. The unvulcanized casing is first shaped to form a toroid, the two or more layers of metal cords are applied to the toroidal casing, the casing with the metal layers is shaped a second time to increase the external equatorial development beyond that obtained during the first shaping process, the layer(s) of polyamide cords and the band of elastomeric material which is to form the tread are applied to the toroidal casing achieved as the result of the second shaping process, over the layers of metal cords, and finally, the tire is expanded and vulcanized under pressure in a mold.

It has now been found that although the tires obtained by the process just described met the demands made, they can be still further improved, particularly with a view to their being used for high speeds and/or under severe conditions of operation.

It must be remembered that the layer or layers of polyamide cords are usually made — for ease of production — by placing a strip of polyamide cords, arranged so that they are parallel to each other and to the side edges of the strip itself, on the layers of metal cords. The strip is at least as wide as the layers of metal cords and longer than the equatorial development achieved by the casing which has the layers of metal cords, as the result of the second shaping process, so that the ends of the strip overlap to a certain extent. In practice, if a single layer of polyamide is to be obtained, the length selected is slightly greater than the aforementioned equatorial development, whereas if two layers of polyamide cords are required, the length of the strip is slightly more than double the aforementioned equatorial development, so that it can be wound round on itself twice, with the final end of the wound strip overlapping the first to a certain extent.

It has been found that although the tires made in this way perform well with regard to steering characteristics etc. when used at very high speeds and/or under severe operating conditions, the useful life of these tires is not entirely satisfactory. In particular, it has been found that the area having less resistance to the various stresses is the one at the side edges of the reinforcement structure, i.e. there where the stresses are notoriously greater both in the case of prolonged operation and use at high speeds, as the result of the effect of the centrifugal force; and, still within the zone mentioned above, the polyamide cords yield precisely at the point where there is overlapping of the ends of the polyamide cord strip used in the reinforcement structure.

Therefore, the aim of the present invention is to obtain tires with a radial casing, and having a reinforcement structure of the type described above, and which do not have the disadvantages indicated.

Therefore, the subject of this invention is a process for the manufacture of tires for vehicle wheels, having a radial casing, a tread and a reinforcement structure inserted between casing and tread, this structure having at least two layers of metal cords, and, in a more radially outward position, at least one layer of cords which are parallel to each other and arranged in a longitudinal direction, these cords consisting or consisting essentially of a fabric which reduces in length as the result of the effect of heat, this process being made up of the following stages:

a) making the casing in the form of a cylinder on an expandible drum;

b) pre-shaping the unvulcanized casing to form a toroid;

c) applying the two or more layers of metal cords to the toroidal casing;

d) shaping the casing with the metal layers, a second time in order to increase the external equatorial development of the casing over that obtained during the first shaping process;

e) applying the layer(s) of cords of the said fabric and a band of elastomeric material to form the tread to the toroidal casing achieved by the second shaping process, over the layers of metal cords; and f) expanding and vulcanizing the tire made in this way in a mold, under pressure, characterized by the fact that a proportion of the said layer(s) of fabric cords is also applied to the casing with the toroidal shape assumed as the result of the first shaping process, together with the two or more layers of metal cords, at each side area of the reinforcement structure, the width of this side area being between one-tenth and one-third of the total width of the structure.

Each proportion of the said layer or layers of fabric cords is applied by placing the said fabric cords on the said layers of metal cords, either by winding round a single cord to form at least one layer, or by winding round a strip having several cords parallel to each other, the length of the said strip being greater than the equatorial development of the casing with the toroidal shape assumed as the result of the first shaping process, so that the ends of the said strip overlap.

Each portion of the said layer or layers of fabric cords, in particular polyamide cords, extends axially outwards so that the relative edge of each of these essentially coincides with the corresponding edge of the underlying layers or metal cords, or even exceeds it.

Preferably, the two or more layers of metal cords, together with the portions of the layer of fabric cords at each side area of the reinforcement structure, are applied to the casing in the form of a separately made, semi-finished component which consists of the two layers of metal cords which have been superimposed and joined together to form a ring, the width of which corresponds to that of the reinforcement structure to be made, and the development of which is approximately the same as the equatorial development of the cashing as the result of the first shaping process; the polyamide cord portions are applied to the outside surface of the ring, at the two side edges.

Completion of the reinforcement structure indicated above, i.e., the application of the layer or layers of polyamide cords at the crown area of the tire (i.e., the area defined by the axially internal edges of the polyamide cord portions), to the casing having the toroidal shape achieved as a result of the second shaping process, is achieved by placing the said layer or layers of fabric cords at least at the crown area of the layers of metal cords arranged on the said casing, either by winding round a single cord to form at least one layer, or winding round a strip consisting or consisting essentially of several cords, parallel to each other, this strip being at least as wide as the crown area of the reinforcement structure, and longer than the equatorial development of the casing as the result of the second shaping process, so that the ends of the strip overlap.

More particularly, the length of the strip can be slightly greater than the equatorial development achieved by the casing after submitting to the second shaping process, so that the ends of the strip overlap to a certain extent; or it can be slightly more than twice the equatorial development, so that it can be wound round on itself, twice.

According to another embodiment of this invention, the layer or layers of fabric cords applied after the second shaping process are wider than the area defined by the axially internal ends of the polyamide cord portions, up to a width equal to that of the layers of metal cords, or even greater than these.

The tires according to the present invention have shown that they fully meet the demands for a high degree of endurance at high speeds and/or under severe operating conditions, and all the other characteristics of good performance and comfort remain the same. It is though that the brilliant results obtained are due to the fact that the polyamide cords in the side portions of the reinforcement structure, which are applied, together with the layers of metal cords, to the casing having the shape achieved as the result of the first shaping process, achieve a development which is really their due in the second shaping process. i.e., a development corresponding to the external casing deelopment in the side areas, and not just a development equal to the external equatorial development achieved by the casing as a result of the second shaping process, as is the case if the polyamide cords are applied in the form of a single strip as wide as the reinforcement structure, and after the second casing shaping process, as previously mentioned. In fact, bearing in mind that the cross-section of the tire has a specific curvature after the first shaping process, the polyamide cords for the side portions applied in accordance with this invention are arranged according to a development which is greater than that of the casing area underneath. During the second casing shaping process, the development of the casing is modified, and although this occurs least in the side sections, it is sufficient to ensure that at the end of this stage, its development essentially coincides with that of the polyamide cords present. Consequently, in the finished tire, and as the result of contraction arising from the hot vulcanizing process, the polyamide cords are in a state of pretension which is completely similar to that of the cords present in the crown area of the reinforcement structure, and will exercise a controlled scarfing effect on the edges of the metal layers underneath.

The direct result affecting the behaviour of the tire is that the stresses which arise during operation at the side areas of the reinforcement structure are effectively opposed as there is an effective distribution of the forces over the entire circumferential development of the polyamide cords present, thereby preventing a concentration of stresses at the overlapped join of the polyamide cord strips.

Naturally, a similar result is obtained if the layers of metal cords are applied to the casing, together with the side portions of the layer or layers of polyamide cords, in the form of a separately made, semi-finished component. More particularly in this case, the semi-finished component is placed on the casing before the first shaping process, so that the crown area of the casing comes into contact with the corresponding internal surface of the semi-finished component; during the subsequent second shaping process, the polyamide cords of the side portions are essentially deposited, as stated previously, on the development achieved by the relative casing zone in that stage.

It is pointed out that although the process which is the subject of this invention is particularly advantageous when, as is usually the case, strips are used to make the layer of layers of polyamide cords of the reinforcement structure, it can be applied equally well if it is considered advantageous to form the layer or layers by winding on one or more cords.

This invention will be more clearly understood from the enclosed drawings where, as an example, and therefore not limitative:

FIG. 3 shows a partial perspective view of the separately made, semi-finished component which, according to another embodiment of the process of this invention, forms the part of the reinforcement structure which is placed on the casing after the first shaping process; and FIG. 4 shows a partial perspective view of a tire obtained according to this invention with parts cut away at the tread for a clearer illustration of the reinforcement structure.

Figure 1:
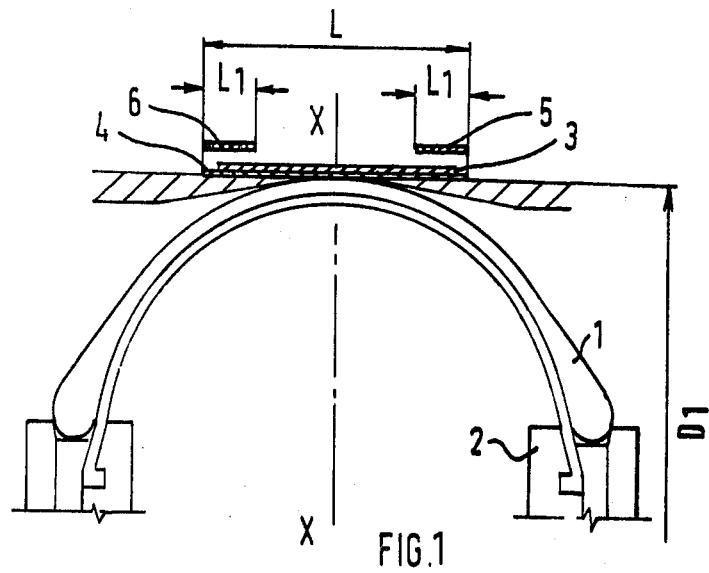
FIG. 1 shows a partial cross-sectional view of the radial casing having the toroidal shape obtained as the result of the first shaping process, to which the metal layers and the side portions of a layer of polyamide cords have been applied in accordance with this invention.

More particularly, FIG. 1 illustrates radial monoply casing 1, intended for a 175 HR 14 tire (however, the casing may consist of several plies). The casing is illustrated on drum 2, having the toroidal shape achieved as the result of the first shaping process, as the result of which the external equatorial development of $\pi D_1$ is 1830 m.

The two layers of metal cords 3 and 4, in which the cords are parallel in each layer and crossed in relation to those of the other layer, and inclined at an angle of 21° in relation to the equatorial plane, are applied to casing 1, having the aforementioned shape. Two strips of polyamide cords, 5 and 6 respectively, are placed at the side edges of these layers. In each strip, the cords are arranged parallel to each other and to the side edges of the strip itself so that on the casing, the cords are essentially parallel to the equatorial plane of the latter. These strips have a width of $L_1$ which is 20% of the total width L of the metal layers, and are 1850 mm long so that they can be wound round layers 3 and 4 and overlap at the ends by 20 mm.

As can be seen from the illustration, at strips 5 and 6, the external development of the casing — by virtue of its curved cross-section — is less than its equatorial development, so that the strips find themselves on a development which is greater than that which is really their due.

Figure 2:
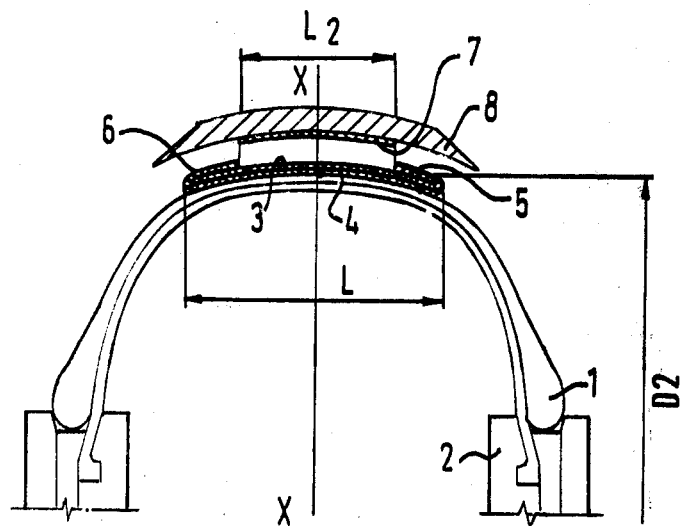
FIG. 2 shows a partial cross-sectional view of the casing after the second shaping process, to which the central portion of the layer of polyamide cords and the tread band have also been applied.

FIG. 2 shows a partial cross-sectional view of the casing illustrated in FIG. 1, after the second shaping process, as the result of which its external equatorial development is increased from $\pi D_1$ to $\pi D_2$, which, in practice, is 1875 mm, whereas at the side edges of the reinforcement structure, the external development of the casing has suffered a lesser variation, thereby increasing it to 1830 mm, so that the polyamide cords of strips 5 and 6 are now arranged on a development which is the same as that of the relative casing zones.

The central portion 7 of the polyamide cord layer, and finally tread band 8, are then placed on layers 3 and 4 of metal cords, at the crown area; in FIG. 2, the portion 7 and the band 8 are shown separated from the casing in order to give a clearer illustration of this stage of the process.

Portion 7 consists of a strip of polyamide cords which are arranged parallel to each other and to the side edges of the strip itself so that once the cords are in position, they are parallel to the equatorial plane of the casing. The length of the strip is slightly more than the casing development $\pi D_2$ so that its ends overlap for 20 mm, whereas the width is the same as the central portion $L_2$, or crown area, of the reinforcement structure, as defined by the axially innermost edges of strips 5 and 6.

As an alternative, and as envisaged by this invention, the central portion may consist of a single polyamide cord wound round layers 3 and 4 so that its coils are arranged parallel to the equatorial plane, so that the entire portion $L_2$ is covered.

As is described in the Italian patent application No. 25,355 A/74 already cited, during the second shaping process the external equatorial development of the casing does not reach the value which it will achieve when the tire is pressed against the value which it will achieve when the tire is pressed against the mold, but remains slightly less. During the molding stage, and as a result of the pressure introduced into the tire, the casing is subjected to the necessary molding tension and the reinforcement structure undergoes further expansion; and, in view of the fact that in the side portions of the layer or layers of polyamide cords, these cords have the same development as the casing zone underneath, as found for the corresponding central portion, they are subjected, in the finished tire, to a tension which is uniform in all the areas of the reinforcement structure. In practice, when vulcanization is complete, the polyamide cords of strips 5 and 6 in the tire illustrated in FIGS. 1 and 2 are arranged on a development of 1850 mm, whereas the polyamide cords of central portion 7 are on a development of 1895 mm.

FIG. 3 shows a partial perspective view of semi-finished component 9 which consists of a ring formed by the two layers of metal cords 3 and 4 and having, at the sides, strips 5 and 6 of polyamide cords, the width $L_1$ of which is equal to 20% of the total width L of the ring. This width L corresponds to that of the reinforcement structure of the tire of FIG. 1 to be made, whereas the diameter of ring 9 corresponds, in practice, to the external equatorial diameter of casing $\pi D_1$.

As has been previously stated, in accordance with a preferred embodiment of this invention, the side portions of the layer or layers of polyamide cords are placed on ring 9 separately, which makes it possible to increase the speed of the tire production processes.

Ring 9 is placed on the casing before the first shaping process; this is done in such a way that the crown area of the casing comes into contact with the corresponding inside surface of ring 9. More air is then introduced, under pressure, into the casing to carry out the second shaping process, followed by the subsequent stages described above to complete the tire.

As has been previously mentioned, the scope of this invention includes making the side portions and/or the central portion of the layer or layers of polyamide cords by means of one or more wound layers of a single cord which cover the entire section $L_1$ once, or more than once, at each edge of the reinforcement structure, and which cover section $L_2$, or even a larger area of the central portion, until the entire width L is covered, or even extend over this width, and also — when making the central portion of the layer or layers of polyamide cords — the use of a strip of these cords, the width of which is the same as that of the entire reinforcement structure, or even greater, until it covers the entire width L, or even extends beyond this width, and the length of which is slightly more than the external equatorial developments $\pi D_2$ of the casing, or twice that value so that the strip can be wound round the casing once or twice with a certain amount of overlap between the ends.

FIG. 4 illustrates tire 10 made according to one of the embodiments indicated above, when side portions 13 and 14 of polyamide cords, each consisting of a strip wound twice round the casing, which has the toroidal shape achieved as a result of the first shaping process, appear on metal cord layers 11 and 12 respectively, at the sides of the reinforcement structure, and the two layers 15 and 16, consisting of a single strip wound twice round the casing, which has the toroidal shape achieved as a result of the second shaping process, appear at the central portion.

It is to be understood that this invention is not limited to that which has been described above, but also includes within its scope any embodiments which may be based on the inventive principle described here.

What is claimed is:

1. A process for the manufacture of tires for vehicle wheels, having a radial casing, a tread and a reinforcement structure inserted between casing and tread, the said structure having at least two layers of metal cords and, in a radially outer position, at lest one layer of cords which are parallel to each other and arranged in a longitudinal direction, these cords consisting essentially of a fabric which reduces in length through the effect of heat, the said process consisting essentially of the following stages:
   a) making the casing in the form of a cylinder on an expansible drum;
   b) first shaping the unvulcanized casing to form a toroid;
   c) applying the two or more layers of metal cords to the toroidal casing;
   d) shaping the casing, with the metal layers, a second time to increase the external equatorial development of the casing so that it is greater than that obtained during the first shaping process;
   e) applying the layer or layers of fabric cords and a band of elastomeric material to form the tread to the casing having the toroidal shaping obtained as a result of the second shaping process, and on top of the layers of metal cords; and
   f) expanding and vulcanizing the tire made in this way in a pressurized mold; characterized by the fact that a portion of the said layer or layers of fabric cords is applied to the said casing, having the toroidal shape obtained as a result of the first shaping process, together with the two or more layers of metal cords, at each side zone of the said reinforcement structure, the width of the said side zone being between one-third and one-tenth of the total width of the structure.

2. A process in accordance with claim 1, characterized by the fact that each portion of the said layer or layers of fabric cords is applied by placing the fabric cords on the said layers of metal cords, either by winding on a single cord to form at least one layer, or winding on a strip consisting of several cords parallel to each other, the length of the said strip being more than the equatorial development of the casing having the toroidal shape obtained as a result of the first shaping process, so that the ends of the strip overlap.

3. A process in accordance with claim 2, characterized by the fact that the two or more layers of metal cords are applied to the casing, together with the portions of the layer of fabric cords at each side of the reinforcement structure, in the form of a separately made, semi-finished component, the width of which corresponds to that of the reinforcement structure, and the length of which is the same as the equatorial development of the casing as a result of the first shaping process.

4. A process in accordance with claim 1, characterized by the fact that the said layer or layers of fabric cords are applied to the casing having the toroidal shape achieved as a result of the second shaping process, by placing the said layer or layers of fabric cords, at least at the crown area of the layers of metal cords arranged on the said casing, either by winding on a single cord to form at least one layer, or by winding on a strip consisting of several cords parallel to each other, the width of the said strip being at least the same as that of the crown area of the reinforcement structure, and the length being more than the equatorial development achieved by the said casing as the result of the second shaping process on that the ends of the strip overlap.

* * * * *